US012633822B2

(12) United States Patent
Abe et al.

(10) Patent No.: US 12,633,822 B2
(45) Date of Patent: May 19, 2026

(54) ELECTRIC POWER SUPPLY SYSTEM AND CONTROL METHOD FOR ELECTRIC POWER SUPPLY SYSTEM

(71) Applicant: HONDA MOTOR CO., LTD., Tokyo (JP)

(72) Inventors: Toshiyuki Abe, Tokyo (JP); Kazuhiko Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 18/426,370

(22) Filed: Jan. 30, 2024

(65) Prior Publication Data

US 2024/0333143 A1 Oct. 3, 2024

(30) Foreign Application Priority Data

Mar. 30, 2023 (JP) ................................. 2023-056647

(51) Int. Cl.
*H02M 3/04* (2006.01)
*B60L 15/00* (2006.01)
*H02J 7/00* (2026.01)

(52) U.S. Cl.
CPC ............. *H02M 3/04* (2013.01); *B60L 15/007* (2013.01); *H02J 7/855* (2026.01); *B60L 2210/10* (2013.01)

(58) Field of Classification Search
None
See application file for complete search history.

(56) References Cited

U.S. PATENT DOCUMENTS

2015/0191088 A1* 7/2015 Gonzales ........... G01R 31/3278
701/34.2
2016/0121749 A1* 5/2016 Mensah-Brown ........ H02J 7/34
307/10.1
(Continued)

FOREIGN PATENT DOCUMENTS

JP 2009038925 A 2/2009
JP 2010057290 A 3/2010
(Continued)

OTHER PUBLICATIONS

Notification of Reasons for Refusal issued Oct. 15, 2024 in the JP Patent Application No. 2023-056647.

*Primary Examiner* — Rexford N Barnie
*Assistant Examiner* — Aqeel H Bukhari
(74) *Attorney, Agent, or Firm* — CKC & Partners Co. LLC

(57) ABSTRACT

An electric power supply system includes: a positive-electrode-side contactor inserted into a positive power line; a negative-electrode-side contactor inserted into a negative power line; a pre-charge circuit; an electric potential difference detector that detects an electric potential difference between both ends of the positive-electrode-side contactor; and a contactor controller that receives an output of the electric potential difference detection circuit, and controls the positive-electrode-side contactor and the negative-electrode-side contactor, in which the contactor controller temporarily turns on the positive-electrode-side contactor in a state where the negative-electrode-ide contactor is turned off when the electric power supply system is started, retains an output of the electric potential difference detection circuit during this on period as a correction value, turns off the positive-electrode-side contactor and turns on the negative-electrode-side contactor after the retention, and turns on the (Continued)

positive-electrode-side contactor when an output of the electric potential difference detection circuit has reached the correction value.

10 Claims, 4 Drawing Sheets

(56) References Cited

U.S. PATENT DOCUMENTS

2020/0274385 A1* 8/2020 Saito ........................ H02M 1/36
2024/0055854 A1   2/2024 Kim et al.

FOREIGN PATENT DOCUMENTS

| JP | 6048363 | B2 | 12/2016 |
| JP | 6394368 | B2 | 9/2018 |
| JP | 2020137334 | A | 8/2020 |
| WO | 2023038400 | A1 | 3/2023 |

* cited by examiner

IG-SW

V_B

V_LK

NEGATIVE ELECTRODE
SIDE CONTACTOR

POSITIVE ELECTRODE
SIDE CONTACTOR

BI-DIRECTIONAL
DC-DC CONVERTER

V_LK=V_B
(AT CORRECTION VALUE)

ELECTRIC POTENTIAL DIFFERENCE DATA

14 — CONTACTOR
CONTROL CIRCUIT

CORRECTION
VALUE
READER — 16

CONTACTOR
CONTROL
OUTPUT

CORRECTION
VALUE RETENTION
CIRCUIT — 15

ELECTRIC POWER SUPPLY SYSTEM AND CONTROL METHOD FOR ELECTRIC POWER SUPPLY SYSTEM

This application is based on and claims the benefit of priority from Japanese Patent Application No. 2023-056647, filed on 30 Mar. 2023, the content of which is incorporated herein by reference.

BACKGROUND OF THE INVENTION

Field of the Invention

The present invention relates to an electric power supply system and a control method for the electric power supply system.

Related Art

In recent years, efforts for realizing a low-carbon society or a decarbonized society have been actively taken, and, for vehicles, research and development related to electric vehicles proceed for reducing $CO_2$ emissions and for improving energy efficiency. In an electric vehicle, electric loads including a drive motor and a battery serving as an electric power supply are coupled to each other via a main contactor.

Furthermore, a circuit that supplies electric power from the electric power supply to drive the loads is provided with a smoothing capacitor that stabilizes an electric power supply voltage. The smoothing capacitor necessitates pre-charging when electric power is supplied to the loads. In this case, it is necessary to mitigate a rush current that occurs when the smoothing capacitor in an electricity discharged state is pre-charged to avoid fusing of the main contactor. In one common measure for such a necessity, a pre-charge circuit having a series coupling body of a pre-charge resistor and a relay is coupled in parallel to a main contactor, and a system including the pre-charge circuit is used to allow a smoothing capacitor to be charged with electricity beforehand for a constant electric charge time constant. Turning on the main contactor after the electric charge time constant has elapsed suppresses a rush current (for example, see Patent Document 1).

On the other hand, recently such a method may be applied in which a bi-directional direct current-direct current (DC-DC) converter is used to increase beforehand a voltage on a secondary side of a main contactor, when viewed from an electric power supply side, to a voltage on a primary side.

The voltage on the secondary side and the voltage of the primary side are monitored, and the main contactor is turned on when both the voltages become substantially identical to each other, suppressing a rush current (for example, see Patent Document 2).

Patent Document 1: Japanese Patent No. 6048363
Patent Document 2: Japanese Patent No. 6394368

SUMMARY OF THE INVENTION

To suppress a rush current that occurs when a contactor is turned on, it is sufficient that voltages at both ends of the contactor are detected, and a turning-on operation is performed at a timing when no electric potential difference occurs between the both ends. To apply this method as an effective method, it is conceivable that highly accurate voltage sensors be used to detect voltages at the both ends of the contactor. However, applying highly accurate voltage sensors leads to a higher hurdle on production management and cost management relating to an electric power supply system of this type, resulting in hindrances for popularizing electric vehicles.

An object of the present invention is to provide an electric power supply system that necessitates no highly accurate voltage sensor for acquiring a timing for turning on a contactor while avoiding a rush current, and a control method for the electric power supply system. Achieving this object makes it possible to reduce a cost of the electric power supply system of this type, and eliminates one of the hindrances for popularizing electric vehicles, resulting in contributions for improving total energy efficiency.

(1) An electric power supply system (for example, an electric power supply system 1 described later) that supplies electric power from a side of a direct current electric power supply (for example, a battery 2 described later) to a side of a load provided with a smoothing capacitor (for example, a smoothing capacitor 5 described later), the electric power supply system including:

a pre-charge circuit (for example, a bi-directional DC-DC converter 12 described later) that pre-charges the smoothing capacitor;

a first polarity side contactor (for example, a positive electrode side contactor 7 described later) inserted into an electric power line for a first polarity (for example, a positive electrode electric power line 6 described later), the electric power line coupling the side of the direct current electric power supply and the side of the load to each other;

a second polarity side contactor (for example, a negative electrode side contactor 9 described later) inserted into an electric power line for a second polarity that is an opposite polarity to the first polarity (for example, a negative electrode electric power line 8 described later), the electric power line coupling the side of the direct current electric power supply and the side of the load to each other; and an electric potential difference detection circuit (for example, an electric potential difference detection circuit 13 described later) that detects an electric potential difference between both ends of the first polarity side contactor.

(2) The electric power supply system described in (1), further including a contactor control circuit (for example, a contactor control circuit 14 described later) that receives an output of the electric potential difference detection circuit, and controls the first polarity side contactor and the second polarity side contactor, in which the contactor control circuit temporarily turns on the first polarity side contactor in a state where the negative electrode side contactor is turned off when the electric power supply system is started, and retains an output of the electric potential difference detection circuit during this on period as a correction value, turns off the first polarity side contactor and turns on the second polarity side contactor after the retention, and monitors an output of the electric potential difference detection circuit, and turns on the first polarity side contactor when an output of the electric potential difference detection circuit during the monitoring has reached the correction value.

(3) The electric power supply system described in (1), in which the pre-charge circuit includes, as a main component, a bi-directional DC-DC converter (for example, the bi-directional DC-DC converter 12 described later).

(4) The electric power supply system described in (1), in which the pre-charge circuit has a series coupling body of a resistor and a contactor, and the series coupling body is coupled in parallel to the first polarity side contactor.

(5) A control method for an electric power supply system (for example, an electric power supply system 1 described later) that supplies electric power from a side of a direct current electric power supply (for example, a battery 2 described later) to a side of a load provided with a smoothing capacitor (for example, a smoothing capacitor 5 described later), and includes:

a first polarity side contactor (for example, a positive electrode side contactor 7 described later) inserted into an electric power line for a first polarity (for example, a positive electrode electric power line 6 described later), the electric power line coupling the side of the direct current electric power supply and the side of the load to each other;

a second polarity side contactor (for example, a negative electrode side contactor 9 described later) inserted into an electric power line for a second polarity that is an opposite polarity to the first polarity (for example, a negative electrode electric power line 8 described later), the electric power line coupling the side of the direct current electric power supply and the side of the load to each other;

a pre-charge circuit (for example, a bi-directional DC-DC converter 12 described later) that pre-charges the smoothing capacitor; and an electric potential difference detection circuit (for example an electric potential difference detection circuit 13 described later) that detects an electric potential difference between both ends of the first polarity side contactor, the control method for the electric power supply system including:

a correction value retaining step of temporarily turning on the first polarity side contactor in a state where the second polarity side contactor is turned off when the electric power supply system is started, and retaining an output of the electric potential difference detection circuit during this on period as a correction value;

an electric potential difference monitoring step of turning off the first polarity side contactor and turning on the second polarity side contactor after the correction value retaining step, and monitoring an output of the electric potential difference detection circuit; and an electric power supply starting step of turning on the positive electrode side contactor when an output of the electric potential difference detection circuit during the monitoring has reached the correction value in the electric potential difference monitoring step.

(6) The control method for the electric power supply system described in (5), in which a bi-directional DC-DC converter included in the pre-charge circuit pre-charges the smoothing capacitor in the electric potential difference monitoring step.

(7) The electric power supply system described in (1), further including a contactor control circuit (for example, a contactor control circuit 14 described later) that receives an output of the electric potential difference detection circuit, and controls the first polarity side contactor and the second polarity side contactor, in which the contactor control circuit includes a correction value reader that reads, as a correction value, a value retained beforehand as a detection value of the electric potential difference detection circuit when the first polarity side contactor is temporarily turned on in a state where the second polarity side contactor is turned off, and turns on the second polarity side contactor in a state where the first polarity side contactor is turned off at an initial stage of starting the electric power supply system, and monitors an output of the electric potential difference detection circuit, and turns on the first polarity side contactor when an output of the electric potential difference detection circuit during the monitoring has reached the correction value that the correction value reader has read.

(8) The electric power supply system described in (7), in which the pre-charge circuit includes, as a main component, a bi-directional DC-DC converter.

(9) The electric power supply system described in (7), in which the pre-charge circuit has a series coupling body of a resistor and a contactor, and the series coupling body is coupled in parallel to the first polarity side contactor.

(10) A control method for an electric power supply system that supplies electric power from a side of a direct current electric power supply (for example, a battery 2 described later) to a side of a load provided with a smoothing capacitor (for example, a smoothing capacitor 5 described later), and includes:

a first polarity side contactor (for example, a positive electrode side contactor 7 described later) inserted into an electric power line for a first polarity (for example, a positive electrode electric power line 6 described later), the electric power line coupling the side of the direct current electric power supply and the side of the load to each other;

a second polarity side contactor (for example, a negative electrode side contactor 9 described later) inserted into an electric power line for a second polarity that is an opposite polarity to the first polarity (for example, a negative electrode electric power line 8 described later), the electric power line coupling the side of the direct current electric power supply and the side of the load to each other;

a pre-charge circuit (for example, a bi-directional DC-DC converter 12 described later) that pre-charges the smoothing capacitor;

an electric potential difference detection circuit (for example, an electric potential difference detection circuit 13 described later) that detects an electric potential difference between both ends of the first polarity side contactor; and a correction value reader (for example, a correction value reader 16 described later) that reads, from a correction value retention circuit (for example, a correction value retention circuit 15 described later) in which a detection value of the electric potential difference detection circuit when the first polarity side contactor is temporarily turned on in a state where the second polarity side contactor is turned off has been stored beforehand, the detection value as a correction value, the control method for the electric power supply system including:

an electric potential difference monitoring step of turning on the second polarity side contactor in a state where the first polarity side contactor is turned off at an initial stage of starting the electric power supply system, and monitoring an output of the electric potential difference detection circuit; and an electric power supply starting step of turning on the first polarity side contactor when an output of the electric potential difference detection circuit during the monitoring has reached the correction value that the correction value reader has read in the electric potential difference monitoring step.

(11) The control method for the electric power supply system described in (10), in which a bi-directional DC-DC converter included in the pre-charge circuit pre-charges the smoothing capacitor in the electric potential difference monitoring step.

In the electric power supply system described in (1), the electric potential difference detection circuit detects an electric potential difference between the both ends of the first polarity side contactor (a positive electrode side contactor in an example illustrated in FIG. 1). Therefore, it is possible to detect, without using a highly accurate voltage sensor having a wider measurement range to measure a voltage on the secondary side of the first polarity side contactor, a timing when a voltage on the secondary side of the positive electrode side contactor becomes identical to a voltage on the primary side. That is, since it is possible to reduce a cost of the electric power supply system of this type without using a highly accurate voltage sensor having a wider measurement range for detecting a timing when pre-charging of a smoothing capacitor on a side of a load has been completed, one of hindrances for popularizing electric vehicles is wiped out, resulting in contributions for improving total energy efficiency.

In the electric power supply system described in (2), the contactor control circuit temporarily turns on the first polarity side contactor in a state where the second polarity side contactor (a negative electrode side contactor in the example illustrated in FIG. 1) is turned off when the electric power supply system is started, and retains an output of the electric potential difference detection circuit during this on period as a correction value. This correction value is, regardless of detection accuracy of the electric potential difference detection circuit, a reference value handled as a value equivalent to zero of an electric potential difference between the primary side and the secondary side of the first polarity side contactor. Turning off the first polarity side contactor and turning on the second polarity side contactor after the correction value has been retained make pre-charging by the pre-charge circuit enable, causing a voltage on the secondary side, which represents a voltage of the smoothing capacitor, to gradually increase. In this state, an output of the electric potential difference detection circuit is monitored, and, when an output of the electric potential difference detection circuit during the monitoring has reached the correction value, that is, when an electric potential difference between the primary side and the secondary side of the first polarity side contactor becomes zero, the first polarity side contactor is turned on. Thereby, it is possible to turn on the first polarity side contactor at an appropriate timing for avoiding a rush current without detecting, at higher accuracy, voltages on the primary side and the secondary side of the first polarity side contactor.

In the electric power supply system described in (3), the pre-charge circuit includes, as a main component, the bi-directional DC-DC converter. Thereby, no circuit having a series coupling body of a pre-charge resistor and a contactor and coupled in parallel to the positive electrode side contactor is necessary, reducing a cost of the electric power supply system.

In the electric power supply system described in (4), the pre-charge circuit has a series coupling body of a resistor and a contactor, and the series coupling body is coupled in parallel to the first polarity side contactor. Therefore, the smoothing capacitor is charged with electricity for an electric charge time constant determined by a capacitance value of the smoothing capacitor and a resistance value of the pre-charge circuit. Therefore, after the electric charge time constant has elapsed, the voltage itself on the secondary side of the first polarity side contactor reaches a voltage close to the voltage on the primary side. Therefore, although it is possible to acquire a timing for turning on the positive electrode side contactor while avoiding a rush current without particularly detecting a voltage in the first polarity side contactor, it is necessary to perform a clocking operation substantially equivalent to the electric charge time constant. In the electric power supply system according to the present disclosure, no action of performing such a clocking operation is taken, but an output of the contactor control circuit is used to appropriately acquire a timing for turning on the first polarity side contactor.

In the control method for the electric power supply system described in (5), the first polarity side contactor is temporarily turned on in a state where the second polarity side contactor is turned off when the electric power supply system is started, and an output of the electric potential difference detection circuit during this on period is retained as a correction value in the correction value retaining step. This correction value is, regardless of detection accuracy of the electric potential difference detection circuit, a reference value handled as a value equivalent to zero of an electric potential difference between the primary side and the secondary side of the first polarity side contactor. Then, the first polarity side contactor is turned off, the second polarity side contactor is turned on, and an output of the electric potential difference detection circuit is monitored in the electric potential difference monitoring step. In the electric power supply starting step, the first polarity side contactor is turned on when an output of the electric potential difference detection circuit during the monitoring has reached the correction value. Thereby, it is possible to turn on the first polarity side contactor at an appropriate timing for avoiding a rush current without detecting, at higher accuracy, voltages on the primary side and the secondary side of the first polarity side contactor.

In the control method for the electric power supply system described in (6), the bi-directional DC-DC converter included in the pre-charge circuit pre-charges the smoothing capacitor in the electric potential difference monitoring step. Thereby, no circuit having a series coupling body of a pre-charge resistor and a contactor and coupled in parallel to the first polarity side contactor is necessary, reducing a cost of the electric power supply system.

In the electric power supply system described in (7), the contactor control circuit includes the correction value reader that reads, as a correction value, a value retained beforehand as a detection value of the electric potential difference detection circuit when the first polarity side contactor is temporarily turned on in a state where the second polarity side contactor is turned off, and turns on the second polarity side contactor in a state where the first polarity side contactor is turned off at an initial stage of starting the electric power supply system, and monitors an output of the electric potential difference detection circuit, and turns on the first polarity side contactor when an output of the electric potential difference detection circuit during the monitoring has reached the correction value that the correction value reader has read. Thereby, it is possible to turn on the first polarity side contactor at an appropriate timing for avoiding a rush current without detecting, at higher accuracy, voltages on the primary side and the secondary side of the first polarity side contactor.

In the electric power supply system described in (8), the pre-charge circuit includes, as a main component, the bi-directional DC-DC converter. Thereby, no circuit having a series coupling body of a pre-charge resistor and a contactor and coupled in parallel to the positive electrode side contactor is necessary, reducing a cost of the electric power supply system.

In the electric power supply system described in (9), the pre-charge circuit has a series coupling body of a resistor and a contactor, and the series coupling body is coupled in parallel to the first polarity side contactor. Therefore, the smoothing capacitor is charged with electricity for an electric charge time constant determined by a capacitance value of the smoothing capacitor and a resistance value of the pre-charge circuit. Therefore, after the electric charge time constant has elapsed, the voltage itself on the secondary side of the first polarity side contactor reaches a voltage close to the voltage on the primary side. Therefore, although it is possible to acquire a timing for turning on the positive electrode side contactor while avoiding a rush current without particularly detecting a voltage in the first polarity side contactor, it is necessary to perform a clocking operation substantially equivalent to the electric charge time constant. In the electric power supply system according to the present disclosure, no action of performing such a clocking operation is taken, but an output of the contactor control circuit is used to appropriately acquire a timing for turning on the first polarity side contactor.

In the control method for the electric power supply system described in (10), the second polarity side contactor is turned on in a state where the first polarity side contactor is turned off at an initial stage of starting the electric power supply system, and an output of the electric potential difference detection circuit is monitored in the electric potential difference monitoring step. Furthermore, in the electric power supply starting step, the first polarity side contactor is turned on when an output of the electric potential difference detection circuit during the monitoring has reached the correction value that the correction value reader has read in the electric potential difference monitoring step. Thereby, it is possible to turn on the first polarity side contactor at an appropriate timing for avoiding a rush current without detecting, at higher accuracy, voltages on the primary side and the secondary side of the first polarity side contactor.

Thereby, in the control method for the electric power supply system described in (11), no circuit having a series coupling body of a pre-charge resistor and a contactor and coupled in parallel to the first polarity side contactor is necessary, reducing a cost of the electric power supply system.

DETAILED DESCRIPTION OF THE INVENTION

Figure 1:
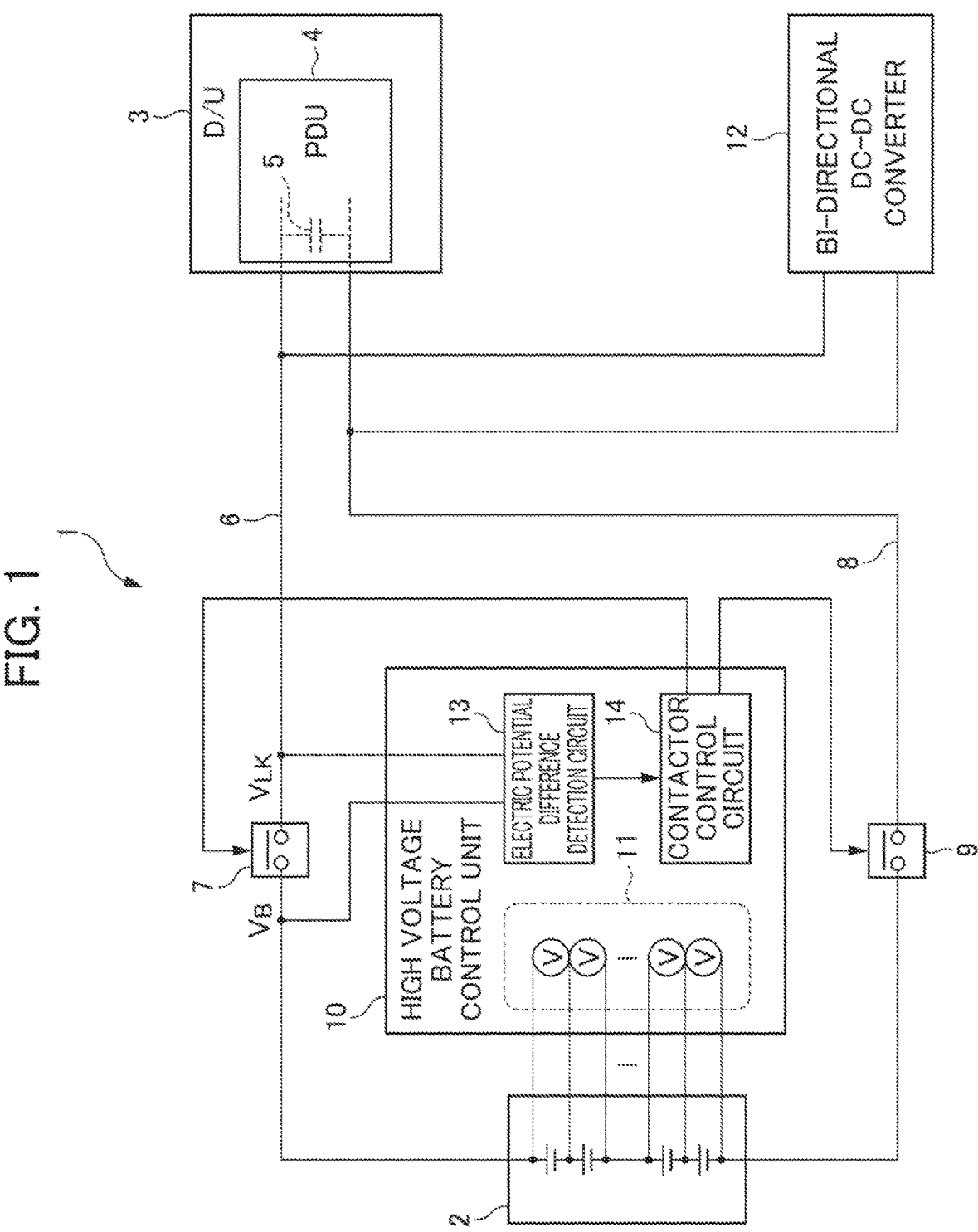
FIG. 1 is a circuit diagram illustrating an example of an electric power supply system according to the present disclosure.

An electric power supply system according to the present disclosure will now be described herein with reference to the accompanying drawings. FIG. 1 is a circuit diagram illustrating an electric power supply system 1 according to the present disclosure.

The electric power supply system 1 is inserted into a circuit that supplies electric power of a battery 2 serving as a direct current electric power supply to a power drive unit (PDU) 4, which represents a load, in a driving unit (DU) 3 in a non-illustrated vehicle. The DU 3 includes a non-illustrated traction motor driven by the PDU 4, and a gear box and a differential gear, which are mechanically coupled to the traction motor, for example. The PDU 4 converts a direct current voltage supplied from the battery 2 into an alternating current voltage, and applies the alternating current voltage to the traction motor. Furthermore, the PDU 4 converts an alternating current voltage inputted during regenerative operation of the traction motor serving as a motor generator into a direct current voltage. The PDU 4 is provided with a smoothing capacitor 5 that smooths the direct current voltage supplied from the battery 2.

A positive electrode side contactor 7 serving as a first polarity side contactor is inserted into a positive electrode electric power line 6 serving as an electric power line for a first polarity, which couples the battery 2 and the PDU 4 to each other. A negative electrode side contactor 9 serving as a second polarity side contactor is inserted into a negative electrode electric power line 8 serving as an electric power line for a second polarity opposite to the first polarity, which couples the battery 2 and the PDU 4 to each other. In the positive electrode side contactor 7, a side of the battery 2 will be hereinafter appropriately referred to as a primary side, and a side of loads including the PDU 4 will be hereinafter appropriately referred to as a secondary side. In the negative electrode side contactor 9, similarly, a side of the battery 2 will be hereinafter appropriately referred to as a primary side, and a side of the loads including the PDU 4 will be hereinafter appropriately referred to as a secondary side. The battery 2 is a high voltage battery having a series coupling body of many cells, and is managed by a high voltage battery control unit 10. That is, the high voltage battery control unit 10 monitors voltages in the cells forming the battery 2 to manage charging and discharging of electricity, and includes cell voltage sensors 11 that monitor the voltages in the cells, respectively.

A bi-directional direct current-direct current (DC-DC) converter 12 is coupled between the positive electrode electric power line 6 and the negative electrode electric power line 8. The bi-directional DC-DC converter 12 pre-charges the smoothing capacitor 5 when the electric power supply system 1 is started. That is, a voltage of an electric power supply such as a non-illustrated low voltage battery is increased, and the increased voltage is supplied to the smoothing capacitor 5 to increase a voltage between terminals of the smoothing capacitor (an electric potential in the positive electrode electric power line 6). Note that, when the positive electrode side contactor 7 is in an on state and the PDU 4 is operating, the bi-directional DC-DC converter 12 lowers a high voltage between the positive electrode electric power line 6 and the negative electrode electric power line 8 and supplies the lowered voltage to a low-voltage-specification auxiliary device, for example.

In the electric power supply system 1 according to the present disclosure, an electric potential difference detection circuit 13 and a contactor control circuit 14 are provided in the high voltage battery control unit 10. The electric potential difference detection circuit 13 detects an electric potential difference between both ends of the positive electrode side contactor 7. An output of the electric potential difference detection circuit 13 is inputted to the contactor control circuit 14. Furthermore, the contactor control circuit 14 supplies control signals to the positive electrode side contactor 7 and the negative electrode side contactor 9 to control their on-off operations.

More specifically, the contactor control circuit 14 temporarily turns on the positive electrode side contactor 7 in a state where the negative electrode side contactor 9 is turned off when the electric power supply system 1 is started, and retains an output of the electric potential difference detection circuit 13 during this on period as a correction value, and turns off the positive electrode side contactor 7 after the correction value has been retained. After the positive electrode side contactor 7 is turned off, the negative electrode side contactor 9 is turned on, and an output of the electric potential difference detection circuit 13 is monitored. During this period of the monitoring, the bi-directional DC-DC converter 12 pre-charges the smoothing capacitor 5 to cause an electric potential on the secondary side of the positive electrode side contactor 7 to gradually approach an electric potential on the primary side. When an output of the electric potential difference detection circuit 13 has reached the retained correction value, the positive electrode side contactor 7 is turned on.

Figure 2:
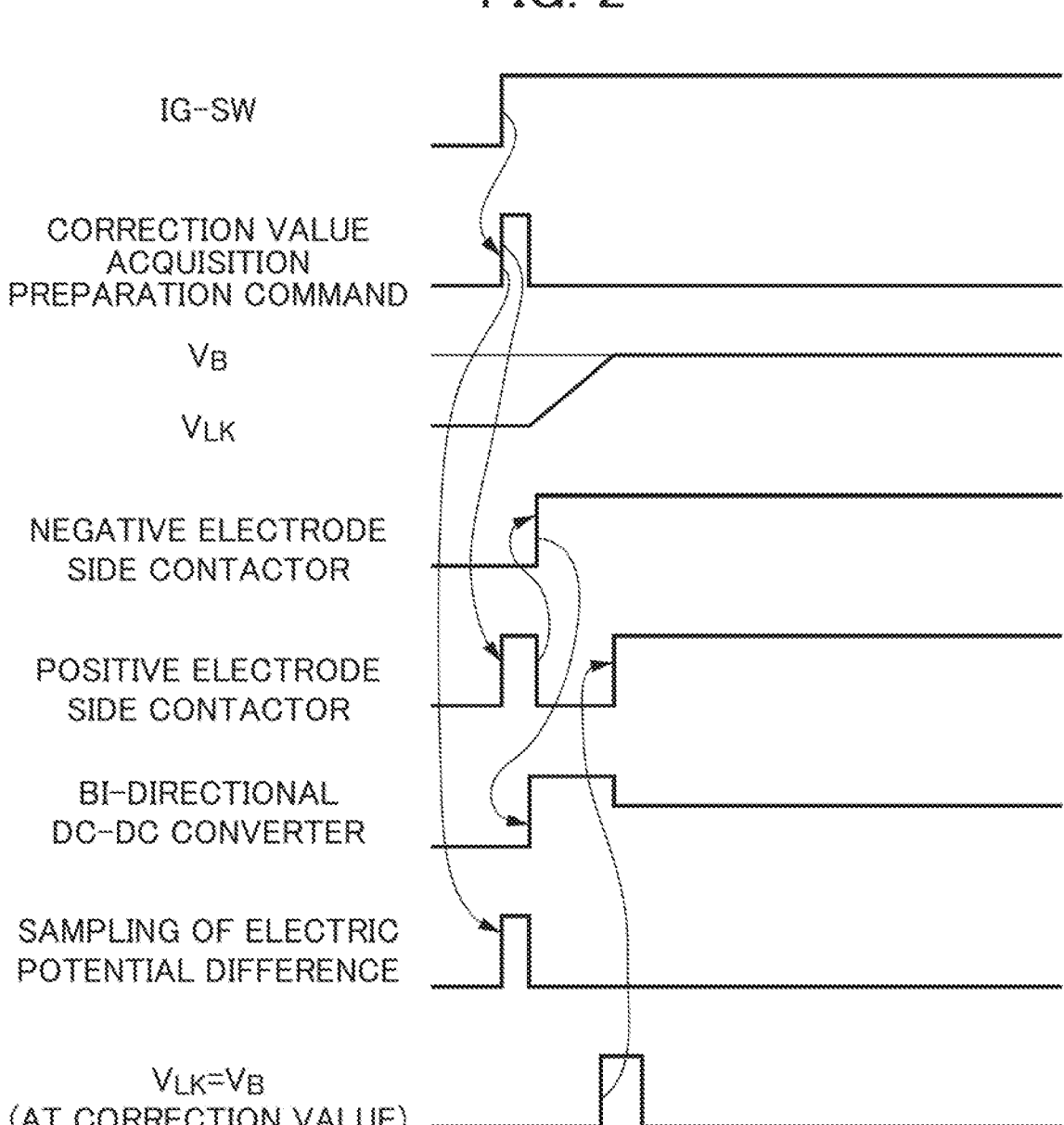
FIG. 2 is a timing chart illustrating operation of the electric power supply system illustrated in FIG. 1.

Next, details of operation of the electric power supply system 1 and a control method for the electric power supply system according to the present disclosure will now be described herein with reference to FIG. 2. FIG. 2 is a timing chart illustrating operation of the electric power supply system 1. Note that, in the below description, the contactor control circuit 14 controls and causes the positive electrode side contactor 7 and the negative electrode side contactor 9 to operate. Furthermore, the contactor control circuit 14 samples, retains, and monitors an output of the electric potential difference detection circuit 13. An electronic control unit (ECU) in the non-illustrated vehicle installed with the electric power supply system 1 according to the present disclosure controls and causes the bi-directional DC-DC converter 12 to operate.

Before a start command IG-SW is formed in accordance with a maneuver of a user, the positive electrode side contactor 7 and the negative electrode side contactor 9 are both in off states, respectively. Since the negative electrode side contactor 9 is turned off, a pre-charging function of the bi-directional DC-DC converter 12 is disabled, and the smoothing capacitor 5 is in a state where electricity is discharged. Furthermore, since the positive electrode side contactor 7 is turned off, an electric potential on the primary side of the positive electrode side contactor 7 is substantially identical to an electric potential on a positive electrode side of the battery 2 ($V_B$ volts with respect to 0 volts), and an electric potential on the secondary side is substantially identical to an electric potential on a positive electrode side of the smoothing capacitor 5 ($V_{LK}$ volts with respect to 0 volts).

In response to a start command IG-SW formed in accordance with a maneuver of the user, a correction value acquisition preparation command is issued from the ECU. In response to the correction value acquisition preparation command, the positive electrode side contactor 7 is temporarily turned on, and an output of the electric potential difference detection circuit 13, which represents an electric potential difference between the primary side and the secondary side of the positive electrode side contactor 7 that is temporarily turned on, is sampled. The contactor control circuit 14 retains the sampled output of the electric potential difference detection circuit 13 as a correction value (a correction value retaining step).

An electric potential difference between the primary side and the secondary side when the positive electrode side contactor 7 is turned on is a value that does not take 0 volts, strictly speaking, due to a minute voltage drop caused by contact resistance in a main contact of the positive electrode side contactor 7 and resistance of other conductors, and is a value for which it is appropriate that it is regarded as 0 volts, for ease of handling. Such a value for which it is appropriate that it is regarded as 0 volts serves as a correction value referred in the present disclosure. That is, it is possible to use a voltage sensor having a relatively narrow measurement range to measure an electric potential difference between the primary side and the secondary side of the positive electrode side contactor 7. Using such a correction value representing a value of this measurement makes it possible to appropriately acquire a timing for turning on the positive electrode side contactor 7 at sufficient accuracy for avoiding a rush current.

If a voltage on the secondary side of the positive electrode side contactor 7 is individually measured, such a necessity arises that a voltage be measured, at higher accuracy, within a wider measurement range from approximately 0 volts to approximately 600 volts inclusive, for example. Therefore, such a highly accurate voltage sensor having a relatively wider measurement range, in which a measurement error is sufficiently small, is demanded. Such a voltage sensor that includes only parts extracted from extremely highly accurate lots with smaller variations is extremely expensive. Therefore, a cost of the electric power supply system of this type is increased, resulting in hindrances for popularizing electric vehicles. The electric power supply system 1 according to the present disclosure necessitates no highly accurate voltage sensor having a wider measurement range for measuring an electric potential difference between the primary side and the secondary side of the positive electrode side contactor 7, making it possible to sweep away such issues as described above.

After the correction value is retained in the correction value retaining step described above, and after the positive electrode side contactor 7 is turned off, the negative electrode side contactor 9 is turned on, and the pre-charging function of the bi-directional DC-DC converter 12 is enabled. In this state, an output of the electric potential difference detection circuit 13 is monitored (an electric potential difference monitoring step).

Since the negative electrode side contactor 9 is turned on in the electric potential difference monitoring step, the pre-charging function of the bi-directional DC-DC converter 12 is enabled, causing an electric potential on the positive electrode side of the smoothing capacitor 5 to gradually increase ($V_{LK}$ volts with respect to 0 volts). As described above, an electric potential on the secondary side of the positive electrode side contactor 7 is represented by $V_{LK}$ volts. The bi-directional DC-DC converter 12 performs a voltage-increasing operation for increasing a voltage of the low voltage battery serving as a non-illustrated low voltage source, for example, to $V_B$ volts representing a normal voltage for the positive electrode electric power line 6 to pre-charge the smoothing capacitor 5. Note that, in the timing chart illustrated in FIG. 2, it is illustrated in an approximated manner that $V_{LK}$ linearly increases to $V_B$.

In the electric potential difference monitoring step, $V_{LK}$ volts representing an electric potential on the positive electrode side of the smoothing capacitor 5, that is, $V_{LK}$ volts representing an electric potential on the secondary side of the positive electrode side contactor 7 gradually increase. Accordingly, an electric potential difference between the primary side and the secondary side of the positive electrode side contactor 7, which represents an output of the electric potential difference detection circuit 13 during the monitoring, gradually decreases. When the potentials on the primary side and secondary side of the positive electrode side contactor 7 become approximately equal, and the output of the potential difference detection circuit 13 reaches the aforementioned correction value, a timing signal VLK=VB is emitted from the contactor control circuit 14 to the positive electrode side contactor 7, causing the positive electrode side contactor 7 to turn on. Note that, when it is referred herein that when an output of the electric potential difference detection circuit 13 has reached the correction value described above, it means that it is sufficient that a detection value of an electric potential difference representing an output of the electric potential difference detection circuit 13 is not strictly coincide with the correction value, but reaches a value falling within a range that is allowable by taking into account electric-current strength of the positive electrode side contactor 7. The positive electrode side contactor 7 is provided with a non-illustrated self-retaining circuit, and the self-retaining circuit holds the positive electrode side contactor 7 in the on state. Thereby, the positive electrode side contactor 7 and the negative electrode side contactor 9 are both turned on, and the electric power supply system 1 moves to a full operation state where electric power of the battery 2 is supplied to the PDU 4 (an electric power supply starting step).

Note that, although the circuit including, as a main component, the bi-directional DC-DC converter 12 has been applied as the pre-charge circuit for the smoothing capacitor 5, as described above, it is possible to apply, as a pre-charge circuit, such a widely known aspect that a series coupling body of a pre-charge resistor and a pre-charge contactor is coupled in parallel to the positive electrode side contactor 7.

As a modification example to the electric power supply system 1 described above with reference to FIGS. 1 and 2, it may be possible to form, so to speak, an electric power supply system in which the function of the positive electrode side contactor 7 and the function of the negative electrode side contactor 9 are switched from each other.

Figure 3:
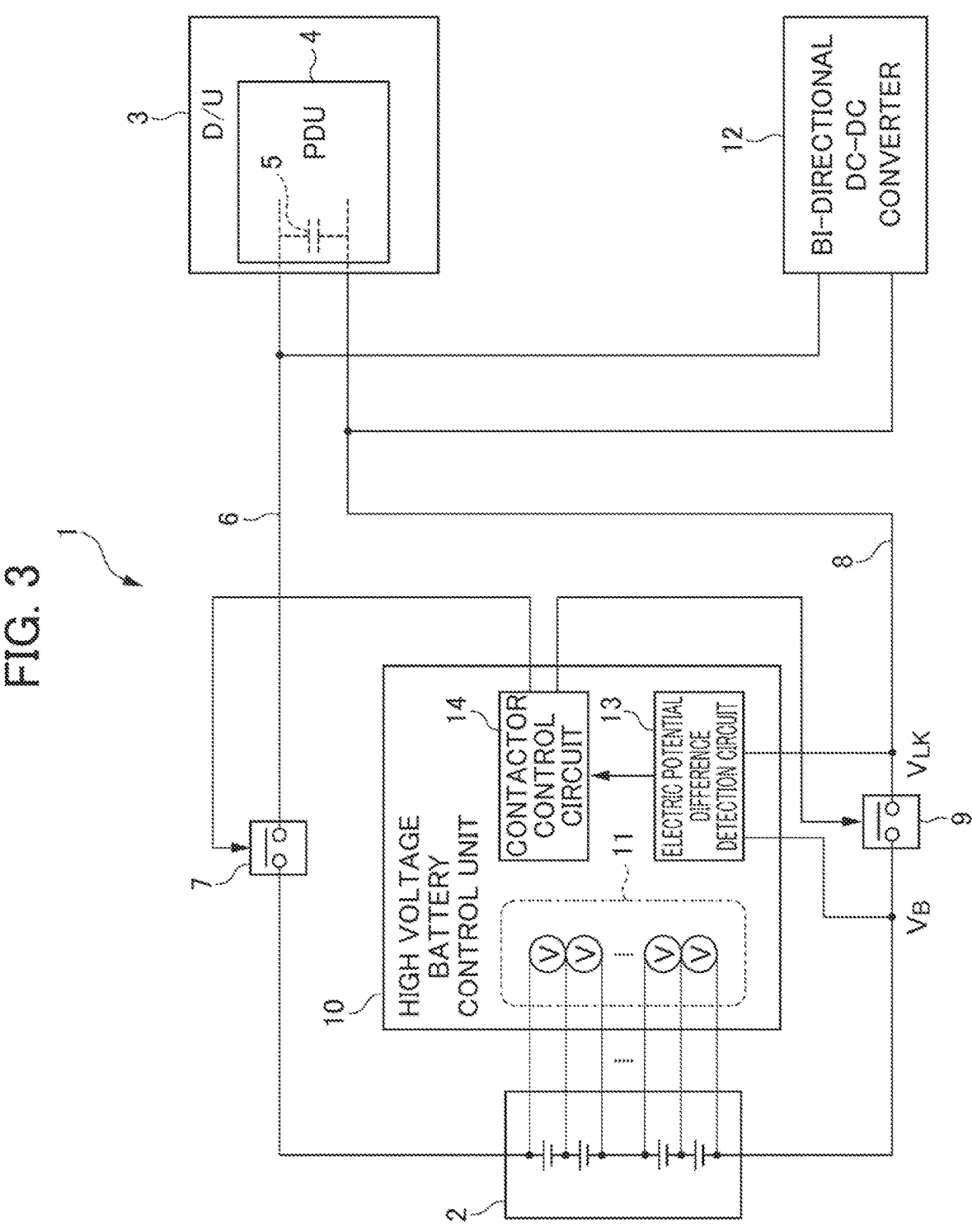
FIG. 3 is a circuit diagram illustrating another example of the electric power supply system according to the present disclosure.

FIG. 3 is a circuit diagram illustrating an electric power supply system in which the function of the positive electrode side contactor 7 and the function of the negative electrode side contactor 9, which are illustrated in FIG. 1, are switched from each other. In FIG. 3, like reference numerals designate identical or corresponding components to those in FIG. 1. In the electric power supply system 1 illustrated in FIG. 3, the electric potential difference detection circuit 13 detects an electric potential difference between both ends of the negative electrode side contactor 9. Therefore, when "negative electrode side contactor" is replaced with and read as "positive electrode side contactor", and "positive electrode side contactor" is replaced with and read as "negative electrode side contactor" in the timing chart illustrated in FIG. 2, a timing chart pertaining to operation of the electric power supply system 1 illustrated in FIG. 3 is achieved. Therefore, to describe details of operation of the electric power supply system 1 illustrated in FIG. 3 and a control method for the electric power supply system, pertaining to the electric power supply system 1 illustrated in FIG. 3, reference is made to the description with reference to FIG. 2.

By the way, in the electric power supply system 1 according to the present disclosure and the control method for the electric power supply system, which are described with reference to FIGS. 1, 2, and 3, a detection value of the electric potential difference detection circuit 13 has been once sampled and retained as a correction value each time when the electric power supply system is started, with the procedure described with reference to FIG. 2. After that, the first polarity side contactor (in the example, the positive electrode side contactor) is turned off, and, when a detection value of the electric potential difference detection circuit 13 has reached the correction value, the first polarity side contactor is turned on to cause the electric power supply system to move to an operation state. However, an aspect of acquiring and retaining a correction value is not limited to the aspects described above with reference to FIGS. 1, 2, and 3.

The electric power supply system according to the present disclosure, in which there are different aspects of acquiring and retaining a correction value, is similar to the electric power supply system illustrated in FIGS. 1 and 3, in terms of conceptual circuit diagram. Note herein that, although such a case is described that the first polarity represents the positive electrode and the second polarity represents the negative electrode, for purposes of description, it may be possible to form a case where there is an opposite, positive-negative correspondence relationship between the first polarity and the second polarity. It is configured that electric power is supplied from the side of the battery 2 serving as a direct current electric power supply to the side of the load provided with the smoothing capacitor 5. The positive electrode electric power line 6 representing the electric power line for the first polarity and the negative electrode electric power line 8 representing the electric power line for the second polarity, which couple the side of the battery 2 and the side of the load to each other, are provided.

The positive electrode side contactor 7 serving as the first polarity side contactor is inserted into the electric power line for the first polarity, and the negative electrode side contactor 9 serving as the second polarity side contactor is inserted into the electric power line for the second polarity. Furthermore, the bi-directional DC-DC converter 12 representing a pre-charge circuit that pre-charges the smoothing capacitor 5 and the electric potential difference detection circuit 13 that detects an electric potential difference between the both ends of the positive electrode side contactor 7 are provided. Furthermore, the contactor control circuit 14 that receives an output of the electric potential difference detection circuit, and controls the first polarity side contactor and the second polarity side contactor is provided.

In this case, the contactor control circuit 14 differs from those in the aspects described above with reference to FIGS. 1, 2, and 3. That is, similar to a contactor control circuit 14 illustrated in FIG. 5, a correction value retention circuit 15 that retains beforehand one as a detection value of the electric potential difference detection circuit 13 when the positive electrode side contactor 7 is temporarily turned on in a state where the negative electrode side contactor 9 is turned off is prepared inside or outside the contactor control circuit 14. The correction value retention circuit 15 may include an electrically erasable programmable read-only memory (EEPROM) or a flash memory. On the other hand, the contactor control circuit 14 includes a correction value reader 16 that reads the value retained in the correction value retention circuit 15 as the correction value.

Figures 4, 5:
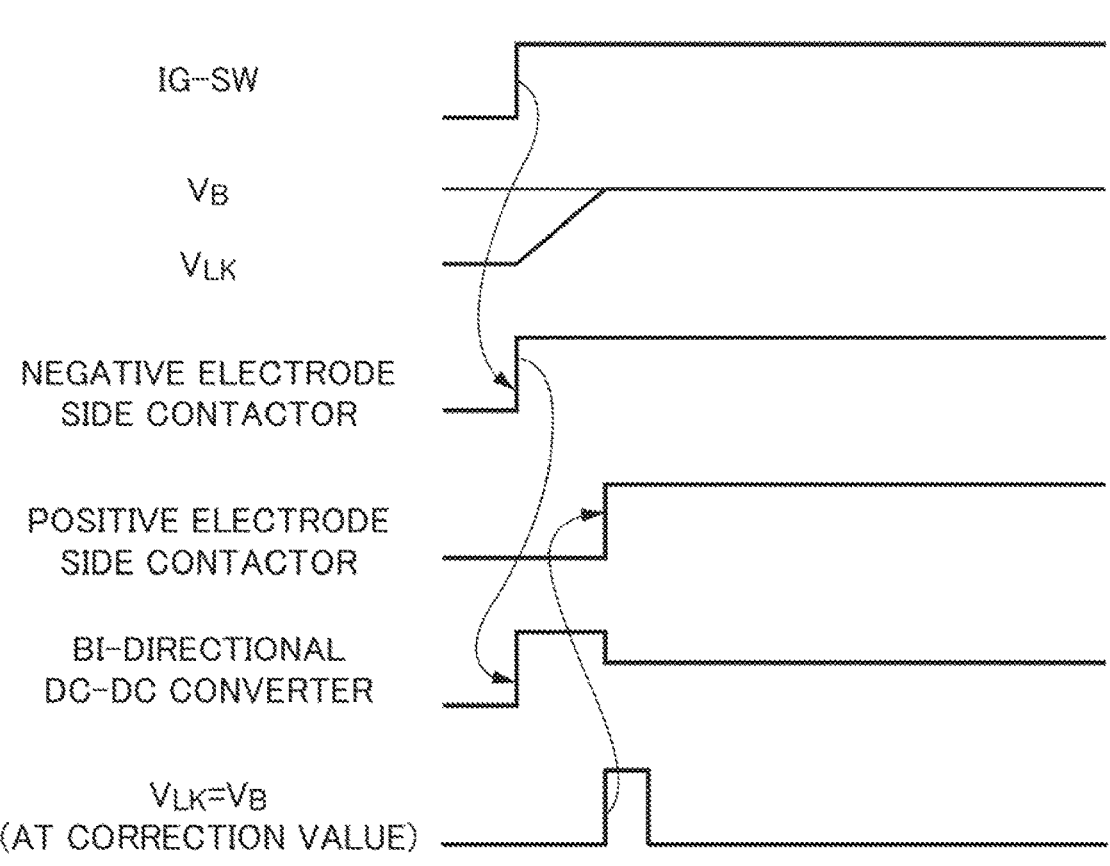
FIG. 4 is a timing chart illustrating operation in still another example of the electric power supply system according to the present disclosure.
FIG. 5 is a conceptual diagram illustrating a contactor control circuit in the still another example of the electric power supply system according to the present disclosure.

FIG. 4 is a timing chart illustrating operation in still another example of the electric power supply system according to the present disclosure. Similar to those in the sequence diagram illustrated in FIG. 4, the contactor control circuit 14 turns on the negative electrode side contactor 9 in a state where the positive electrode side contactor 7 is turned off at an initial stage of starting the electric power supply system, monitors an output of the electric potential difference detection circuit 13, and, when an output of the electric potential difference detection circuit 13 during the monitoring reaches the correction value that the correction value reader has read, turns on the positive electrode side contactor 7.

Even in the example described with reference to FIGS. 4 and 5, it is possible to turn on the first polarity side contactor (the positive electrode side contactor) at an appropriate timing for avoiding a rush current without detecting, at higher accuracy, voltages on the primary side and the secondary side of the first polarity side contactor (in the example, the positive electrode side contactor 7).

By the way, it is conceivable that there are various aspects for a timing of causing a storage element such as an EEPROM or a flash memory applied as the correction value retention circuit 15 to retain beforehand such a correction value as described above. Examples of the aspects are as described below:

(a) The electric power supply system 1 is caused, when its operation is ended, to perform one sequence of sampling an output of the electric potential difference detection circuit 13 illustrated in FIG. 2, and a storage element is caused to retain a correction value acquired as a result of the sampling.

(b) The electric power supply system 1 is caused, at a final stage in a production line for a vehicle, in a presumed case where the electric power supply system is manufactured and installed in the vehicle, to perform one sequence of sampling an output of the electric potential difference detection circuit 13 illustrated in FIG. 2, and a storage element is caused to retain a correction value acquired as a result of the sampling.

(c) The electric power supply system 1 is caused, in a case where the electric power supply system is installed in a vehicle, to perform one sequence of sampling an output of the electric potential difference detection circuit 13 illustrated in FIG. 2, based on time data acquired from a device that may issue clock information, such as a global positioning system (GPS), at a constant interval, and a storage element is caused to retain a correction value acquired as a result of the sampling.

(d) The electric power supply system 1 is caused, by focusing on temperature dependency of its characteristic fluctuation, to perform one sequence of designating the electric potential difference detection circuit 13 or its nearby location as a detection point, using a temperature detection element to acquire temperature information, and sampling an output of the electric potential difference detection circuit 13 illustrated in FIG. 2 in accordance with a fluctuation range of the acquired temperature, and a storage element is caused to retain a correction value acquired as a result of the sampling.

With the electric power supply system 1 and the control method for the electric power supply system according to the present disclosure, it is possible to achieve effects described below.

In the electric power supply system 1 described in (1), the electric potential difference detection circuit 13 detects an electric potential difference between the both ends of the positive electrode side contactor 7. Therefore, it is possible to detect, without using a highly accurate voltage sensor having a wider measurement range to measure a voltage on the secondary side of the positive electrode side contactor 7, a timing when a voltage on the secondary side of the positive electrode side contactor 7 becomes identical to a voltage on the primary side. That is, since it is possible to reduce a cost of the electric power supply system of this type without using a highly accurate voltage sensor having a wider measurement range for detecting a timing when pre-charging of the smoothing capacitor 5 on the side of the load has been completed, one of hindrances for popularizing electric vehicles is wiped out, resulting in contributions for improving total energy efficiency.

In the electric power supply system 1 described in (2), the contactor control circuit 14 temporarily turns on the positive electrode side contactor 7 in a state where the negative electrode side contactor 9 is turned off when the electric power supply system 1 is started, and retains an output of the electric potential difference detection circuit 13 during this on period as a correction value. This correction value is, regardless of detection accuracy of the electric potential difference detection circuit 13, a reference value handled as a value equivalent to zero of an electric potential difference between the primary side and the secondary side of the positive electrode side contactor 7. After the correction value has been retained, the contactor control circuit 14 controls and turns off the positive electrode side contactor 7 and turns on the negative electrode side contactor 9. As the negative electrode side contactor 9 is turned on, the pre-charging function provided by the bi-directional DC-DC converter 12 representing a pre-charge circuit is enabled. That is, the smoothing capacitor 5 is pre-charged at a high voltage applied through a voltage-increasing operation of the bi-directional DC-DC converter 12. Thereby, $V_{LK}$ representing an electric potential on the secondary side of the positive electrode side contactor 7, which represents a voltage of the smoothing capacitor 5, gradually increases. In this state, the contactor control circuit 14 monitors an output of the electric potential difference detection circuit 13, and, when an output of the electric potential difference detection circuit 13 during the monitoring has reached the correction value, that is, when an electric potential difference between the primary side and the secondary side of the positive electrode side contactor 7 becomes a value equivalent to zero, turns on the positive electrode side contactor 7. Therefore, it is possible to acquire an appropriate timing for avoiding a rush current to turn on the positive electrode side contactor 7 without detecting, at higher accuracy, voltages on the primary side and the secondary side of the positive electrode side contactor 7. The electric power supply system 1 according to the present disclosure, which necessitates no highly accurate voltage sensor for measuring an electric potential difference between the primary side and the secondary side of the positive electrode side contactor 7, makes it possible to avoid an increase in cost relating to voltage measurement, which may occur when highly accurate voltage sensors each having a relatively wider measurement range are used to independently measure voltages on the primary side and the secondary side of the positive electrode side contactor 7, while keeping product quality. Such features as described above result in facilitation of popularizing electric vehicles.

In the electric power supply system 1 described in (3), the pre-charge circuit includes, as a main component, the bi-directional DC-DC converter 12. Thereby, no circuit having a series coupling body of a pre-charge resistor and a contactor and coupled in parallel to the positive electrode side contactor 7 is necessary, reducing a cost of the electric power supply system 1.

In the electric power supply system described in (4), the pre-charge circuit has a series coupling body of a resistor and a contactor, and the series coupling body is coupled in parallel to the positive electrode side contactor. Therefore, the smoothing capacitor 5 is charged with electricity for an electric charge time constant determined by a capacitance value of the smoothing capacitor and a resistance value of the pre-charge circuit. Therefore, after the electric charge time constant has elapsed, the voltage itself on the secondary side of the positive electrode side contactor 7 reaches a voltage close to the voltage on the primary side. Therefore, it is possible to acquire a timing for turning on the positive electrode side contactor 7 while avoiding a rush current without particularly detecting a voltage in the positive electrode side contactor 7. However, in a case of this aspect, it is necessary to perform a clocking operation substantially equivalent to the electric charge time constant. In the electric power supply system according to the present disclosure, no action of performing such a clocking operation is taken, but an output of the electric potential difference detection circuit 13 is monitored, and an output of the contactor control circuit 14 that is operating is used to appropriately acquire a timing for turning on the positive electrode side contactor 7.

In the control method for the electric power supply system described in (5), the positive electrode side contactor 7 is temporarily turned on in a state where the negative electrode side contactor 9 is turned off when the electric power supply system 1 is started, and an output of the electric potential difference detection circuit 13 during this on period is retained as a correction value in the correction value retaining step. This correction value is, regardless of detection accuracy of the electric potential difference detection circuit 13, a reference value handled as a value equivalent to zero of an electric potential difference between the primary side and the secondary side of the positive electrode side contactor 7. Then, the positive electrode side contactor 7 is turned off, the negative electrode side contactor 9 is turned on, and an output of the electric potential difference detection circuit 13 is monitored in the electric potential difference monitoring step. In the electric power supply starting step, the positive electrode side contactor 7 is turned on when an output of the electric potential difference detection circuit 13 during the monitoring has reached the correction value. Thereby, it is possible to turn on the positive electrode side contactor 7 at an appropriate timing for avoiding a rush current without detecting, at higher accuracy, voltages on the primary side and the secondary side of the positive electrode side contactor 7. With the control method for the electric power supply system according to the present disclosure, which necessitates no highly accurate voltage sensor for measuring an electric potential difference between the primary side and the secondary side of the positive electrode side contactor 7, makes it possible to avoid an increase in cost relating to voltage measurement, which may occur when highly accurate voltage sensors are used to independently measure voltages on the primary side and the secondary side of the positive electrode side contactor 7, while keeping product quality. Such features as described above result in facilitation of popularizing electric vehicles.

In the control method for the electric power supply system described in (6), the bi-directional DC-DC converter 12 included in the pre-charge circuit pre-charges the smoothing capacitor 5 in the electric potential difference monitoring step. Thereby, no circuit having a series coupling body of a pre-charge resistor and a contactor and coupled in parallel to the positive electrode side contactor is necessary, reducing a cost of the electric power supply system.

In the electric power supply system 1 described in (7), the contactor control circuit 14 includes the correction value reader 16 that reads, as a correction value, a value retained beforehand in the correction value retention circuit 15 as a detection value of the electric potential difference detection circuit 13 when the first polarity side contactor (the positive electrode side contactor 7) is temporarily turned on in a state where the second polarity side contactor (the negative electrode side contactor 9) is turned off, and, turns on the second polarity side contactor in a state where the first polarity side contactor is turned off at an initial stage of starting the electric power supply system, monitors an output of the electric potential difference detection circuit 13, and, when an output of the electric potential difference detection circuit 13 during the monitoring reaches the correction value that the correction value reader 16 has read, turns on the first polarity side contactor. Thereby, it is possible to turn on the first polarity side contactor at an appropriate timing for avoiding a rush current without detecting, at higher accuracy, voltages on the primary side and the secondary side of the first polarity side contactor.

In the electric power supply system described in (8), the pre-charge circuit includes, as a main component, the bi-directional DC-DC converter 12. Thereby, no circuit having a series coupling body of a pre-charge resistor and a contactor and coupled in parallel to the positive electrode side contactor is necessary, reducing a cost of the electric power supply system 1.

In the electric power supply system described in (9), the pre-charge circuit has a series coupling body of a resistor and a contactor, and the series coupling body is coupled in parallel to the first polarity side contactor. Therefore, the smoothing capacitor 5 is charged with electricity for an electric charge time constant determined by a capacitance value of the smoothing capacitor and a resistance value of the pre-charge circuit. Therefore, after the electric charge time constant has elapsed, the voltage itself on the secondary side of the first polarity side contactor reaches a voltage close to the voltage on the primary side. Therefore, although it is possible to acquire a timing for turning on the positive electrode side contactor while avoiding a rush current without particularly detecting a voltage in the first polarity side contactor, it is necessary to perform a clocking operation substantially equivalent to the electric charge time constant. In the electric power supply system according to the present disclosure, no action of performing such a clocking operation is taken, but an output of the contactor control circuit 14 is used to appropriately acquire a timing for turning on the first polarity side contactor 7.

In the control method for the electric power supply system described in (10), the second polarity side contactor 9 is turned on in a state where the first polarity side contactor 7 is turned off at an initial stage of starting the electric power supply system, and an output of the electric potential difference detection circuit 13 is monitored in the electric potential difference monitoring step. Furthermore, in the electric power supply starting step, the first polarity side contactor 7 is turned on when an output of the electric potential difference detection circuit 13 during the monitoring has reached the correction value that the correction value reader 16 has read in the electric potential difference monitoring step. Thereby, it is possible to turn on the positive electrode side contactor at an appropriate timing for avoiding a rush current without detecting, at higher accuracy, voltages on the primary side and the secondary side of the first polarity side contactor 7.

In the control method for the electric power supply system described in (11), the bi-directional DC-DC converter 12 included in the pre-charge circuit pre-charges the smoothing capacitor 5 in the electric potential difference monitoring step. Thereby, no circuit having a series coupling body of a pre-charge resistor and a contactor and coupled in parallel to the positive electrode side contactor is necessary, reducing a cost of the electric power supply system.

Although the embodiment of the electric power supply system and the control method for the electric power supply system according to the present disclosure has been described, the present invention is not limited to the embodiment. The present invention may be appropriately altered in detailed configuration within the scope of the present invention. For example, instead of providing the electric potential difference detection circuit 13 and the contactor control circuit 14 in the high voltage battery control unit 10, functional portions corresponding to the electric potential difference detection circuit 13 and the contactor control circuit 14 may be provided in another unit such as another ECU.

EXPLANATION OF REFERENCE NUMERALS

1 Electric power supply system
2 Battery
3 DU
4 PDU
5 Smoothing capacitor
6 Positive electrode electric power line
7 Positive electrode side contactor
8 Negative electrode electric power line
9 Negative electrode side contactor
10 High voltage battery control unit
11 Cell voltage sensor
12 Bi-directional DC-DC converter
13 Electric potential difference detection circuit
14 Contactor control circuit
15 Correction value retention circuit
16 Correction value reader

What is claimed is:

1. An electric power supply system that supplies electric power from a side of a direct current electric power supply to a side of a load provided with a smoothing capacitor, the electric power supply system comprising:

a pre-charge circuit that pre-charges the smoothing capacitor;

a first polarity side contactor inserted into an electric power line for a first polarity, the electric power line coupling the side of the direct current electric power supply and the side of the load to each other;

a second polarity side contactor inserted into an electric power line for a second polarity that is an opposite polarity to the first polarity, the electric power line coupling the side of the direct current electric power supply and the side of the load to each other;

an electric potential difference detection circuit that detects an electric potential difference between both ends of the first polarity side contactor and;

a contactor control circuit that receives an output of the electric potential difference detection circuit, and controls the first polarity side contactor and the second polarity side contactor, wherein the contactor control circuit temporarily turns on the first polarity side contactor in a state where the second polarity side contactor is turned off when the electric power supply system is started, and retains an output of the electric potential difference detection circuit during this on period as a correction value, turns off the first polarity side contactor and turns on the second polarity side contactor after the retention, and monitors an output of the electric potential difference detection circuit, and turns on the first polarity side contactor when an output of the electric potential difference detection circuit during the monitoring has reached the correction value.

2. The electric power supply system according to claim 1, wherein the pre-charge circuit includes, as a main component, a bi-directional direct current-direct current (DC-DC) converter.

3. The electric power supply system according to claim 1, wherein the pre-charge circuit has a series coupling body of a resistor and a contactor, and the series coupling body is coupled in parallel to the first polarity side contactor.

4. A control method for an electric power supply system that supplies electric power from a side of a direct current electric power supply to a side of a load provided with a smoothing capacitor, and includes:

a first polarity side contactor inserted into an electric power line for a first polarity, the electric power line coupling the side of the direct current electric power supply and the side of the load to each other;

a second polarity side contactor inserted into an electric power line for a second polarity that is an opposite polarity to the first polarity, the electric power line coupling the side of the direct current electric power supply and the side of the load to each other; a pre-charge circuit that pre-charges the smoothing capacitor; and an electric potential difference detection circuit that detects an electric potential difference between both ends of the first polarity side contactor, the control method for the electric power supply system comprising:

a correction value retaining step of temporarily turning on the first polarity side contactor in a state where the second polarity side contactor is turned off when the electric power supply system is started, and retaining an output of the electric potential difference detection circuit during this on period as a correction value;

an electric potential difference monitoring step of turning off the first polarity side contactor and turning on the second polarity side contactor after the correction value retaining step, and monitoring an output of the electric potential difference detection circuit; and an electric power supply starting step of turning on the first polarity side contactor when an output of the electric potential difference detection circuit during the monitoring has reached the correction value in the electric potential difference monitoring step.

5. The control method for the electric power supply system according to claim 4, wherein a bi-directional direct current-direct current (DC-DC) converter included in the pre-charge circuit pre-charges the smoothing capacitor in the electric potential difference monitoring step.

6. An electric power supply system that supplies electric power from a side of a direct current electric power supply to a side of a load provided with a smoothing capacitor, the electric power supply system comprising:

a pre-charge circuit that pre-charges the smoothing capacitor;

a first polarity side contactor inserted into an electric power line for a first polarity, the electric power line coupling the side of the direct current electric power supply and the side of the load to each other;

a second polarity side contactor inserted into an electric power line for a second polarity that is an opposite polarity to the first polarity, the electric power line coupling the side of the direct current electric power supply and the side of the load to each other;

an electric potential difference detection circuit that detects an electric potential difference between both ends of the first polarity side contactor; and a contactor control circuit that receives an output of the electric potential difference detection circuit, and controls the first polarity side contactor and the second polarity side contactor, wherein the contactor control circuit includes a correction value reader that reads, as a correction value, a value retained beforehand as a detection value of the electric potential difference detection circuit when the first polarity side contactor is temporarily turned on in a state where the second polarity side contactor is turned off, and turns on the second polarity side contactor in a state where the first polarity side contactor is turned off at an initial stage of starting the electric power supply system, and monitors an output of the electric potential difference detection circuit, and turns on the first polarity side contactor when an output of the electric potential difference detection circuit during the monitoring has reached the correction value that the correction value reader has read.

7. The electric power supply system according to claim 6, wherein the pre-charge circuit includes, as a main component, a bi-directional direct current-direct current (DC-DC) converter.

8. The electric power supply system according to claim 6, wherein the pre-charge circuit has a series coupling body of a resistor and a contactor, and the series coupling body is coupled in parallel to the first polarity side contactor.

9. A control method for an electric power supply system that supplies electric power from a side of a direct current electric power supply to a side of a load provided with a smoothing capacitor, and includes:

a first polarity side contactor inserted into an electric power line for a first polarity, the electric power line coupling the side of the direct current electric power supply and the side of the load to each other;

a second polarity side contactor inserted into an electric power line for a second polarity that is an opposite polarity to the first polarity, the electric power line coupling the side of the direct current electric power supply and the side of the load to each other;

a pre-charge circuit that pre-charges the smoothing capacitor;

an electric potential difference detection circuit that detects an electric potential difference between both ends of the first polarity side contactor; and a correction value reader that reads, from a correction value retention circuit in which a detection value of the electric potential difference detection circuit when the first polarity side contactor is temporarily turned on in a state where the second polarity side contactor is turned off has been stored beforehand, the detection value as a correction value, the control method for the electric power supply system comprising:

an electric potential difference monitoring step of turning on the second polarity side contactor in a state where the first polarity side contactor is turned off at an initial stage of starting the electric power supply system, and monitoring an output of the electric potential difference detection circuit; and an electric power supply starting step of turning on the first polarity side contactor when an output of the electric potential difference detection circuit during the monitoring has reached the correction value that the correction value reader has read in the electric potential difference monitoring step.

10. The control method for the electric power supply system according to claim 9, wherein a bi-directional direct current-direct current (DC-DC) converter included in the pre-charge circuit pre-charges the smoothing capacitor in the electric potential difference monitoring step.

* * * * *